(12) United States Patent
Kim

(10) Patent No.: US 7,565,182 B2
(45) Date of Patent: Jul. 21, 2009

(54) WIRELESS CELL PHONE

(75) Inventor: Young S. Kim, Los Altos, CA (US)

(73) Assignee: Samsung Electronics Co., Ltd. (KR)

( * ) Notice: Subject to any disclaimer, the term of this patent is extended or adjusted under 35 U.S.C. 154(b) by 697 days.

(21) Appl. No.: 10/692,189

(22) Filed: Oct. 22, 2003

(65) Prior Publication Data

US 2004/0142734 A1  Jul. 22, 2004

Related U.S. Application Data

(60) Provisional application No. 60/420,747, filed on Oct. 22, 2002.

(51) Int. Cl.
*H04M 1/00* (2006.01)

(52) U.S. Cl. ............... 455/575.1; 455/575.3; 455/90.3; 455/575.4; 455/556

(58) Field of Classification Search ... 455/575.1–575.9, 455/550, 550.1, 556, 573.3, 90.3, 90.5, 556.2, 455/577, 347–349; 379/428.01–428.04
See application file for complete search history.

(56) References Cited

U.S. PATENT DOCUMENTS

| | | | |
|---|---|---|---|
| 6,549,789 B1 * | 4/2003 | Kfoury | 455/550.1 |
| 6,850,784 B2 * | 2/2005 | SanGiovanni | 455/575.1 |
| 6,925,313 B2 * | 8/2005 | Kweon et al. | 455/566 |
| 6,956,540 B1 * | 10/2005 | Yoshihara et al. | 345/1.1 |
| 6,999,802 B2 * | 2/2006 | Kim | 455/575.1 |
| 7,120,474 B1 * | 10/2006 | Sharp | 455/575.1 |
| 2002/0072395 A1 * | 6/2002 | Miramontes | 455/566 |
| 2003/0064750 A1 * | 4/2003 | Oh et al. | 455/556 |
| 2003/0157957 A1 * | 8/2003 | Wendorff et al. | 455/550 |
| 2004/0203485 A1 * | 10/2004 | Lenchik et al. | 455/90.1 |
| 2004/0229663 A1 * | 11/2004 | Tosey et al. | 455/575.1 |

* cited by examiner

*Primary Examiner*—Vivian Chin
*Assistant Examiner*—Disler Paul
(74) *Attorney, Agent, or Firm*—The Farrell Law Firm, LLP

(57) ABSTRACT

A wireless cell phone comprising a handset, a keypad assembly rotatably coupled to the handset, and a handset cover rotatably coupled to the handset. The keypad assembly is rotatable about at least two axes, and removable from the handset. The keypad assembly has a first side for a telephone keypad and a second side for a data communication keypad. The handset cover is rotatably coupled to the handset and includes an exterior display and an interior display. The exterior display is capable of displaying electronic information when the handset cover is in a folded position with respect to the handset.

12 Claims, 8 Drawing Sheets

Version 2: double sided keypad rotates and pivots about a two axis hinge.

keypad rotates around pivot

Version 1 - removeable double sided keypad

WIRELESS CELL PHONE

CROSS-REFERENCES TO RELATED APPLICATION

This application claims the benefit of and priority to U.S. Provisional Application No. 60/420,747 filed Oct. 22, 2002, the disclosure of which is hereby incorporated by reference.

FIELD OF THE INVENTION

The present invention is directed to a wireless cell phone which can be configured as a mobile telephone and for a variety of other tasks.

BACKGROUND OF THE INVENTION

Modern mobile cell phones not only provide voice communication but also are useful for a variety of other tasks such as email, internet access, photography, etc. In most present-day cell phones the telephone keypad serves the dual function of dialing telephone numbers and as an input device for the other functions. As mobile telephones become smaller and smaller, it is more difficult to depress the proper keys for carrying out the various other functions. There is a need for a mobile telephone which can be configured to provide a keyboard for the other functions which is easier to manipulate.

OBJECTS AND SUMMARY OF THE INVENTION

It is an object of the present invention to provide a cell phone with a foldable, rotatable or an insertable keyboard assembly wherein in one position the keyboard assembly serves as a telephone keypad while in another position the keyboard serves as a data communicator for carrying out the other functions available with the telephone.

BRIEF DESCRIPTION OF THE DRAWINGS

This invention will be more clearly understood from the following detailed description of the invention when read in conjunction with the accompanying drawings of which.

DESCRIPTION OF PREFERRED EMBODIMENTS

Figure 1:
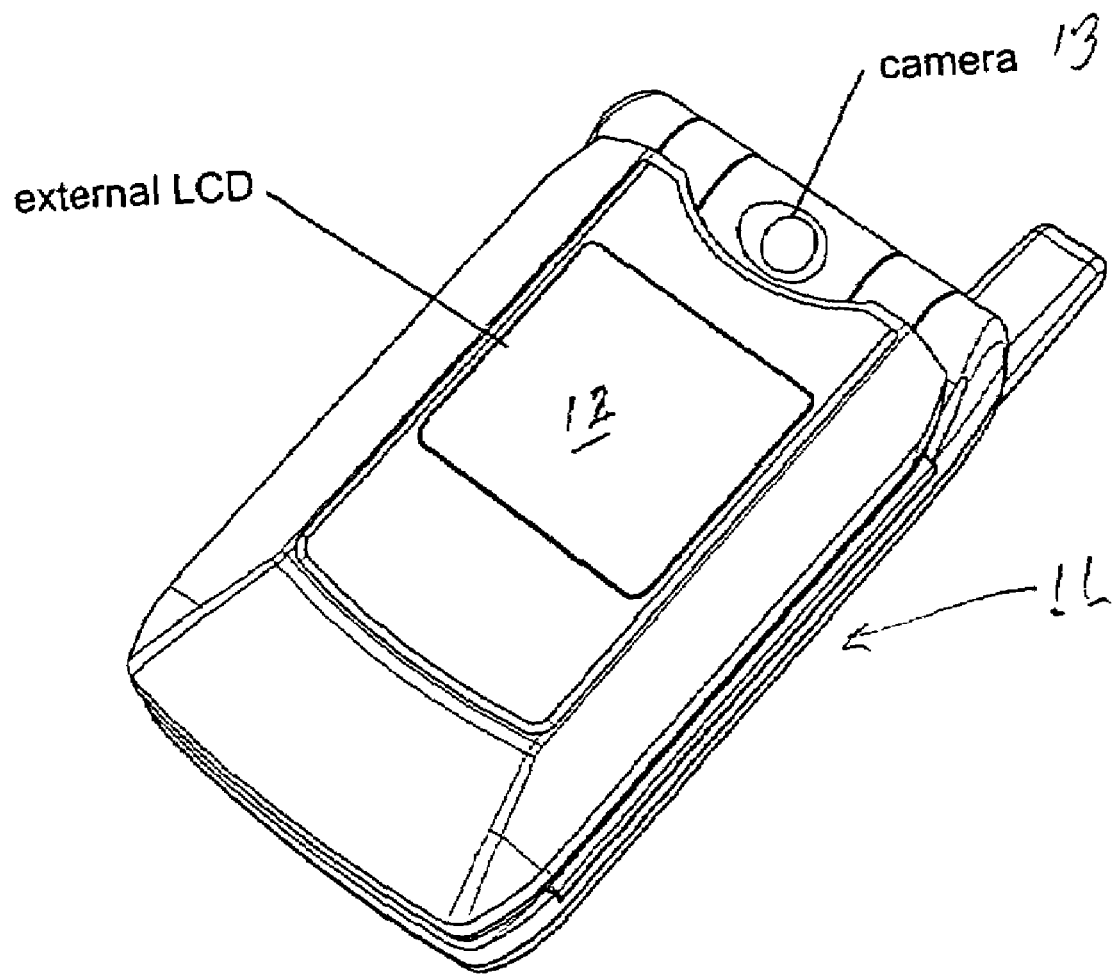
FIG. 1 is a perspective view of the cell phone in the closed position.
Figure 2:
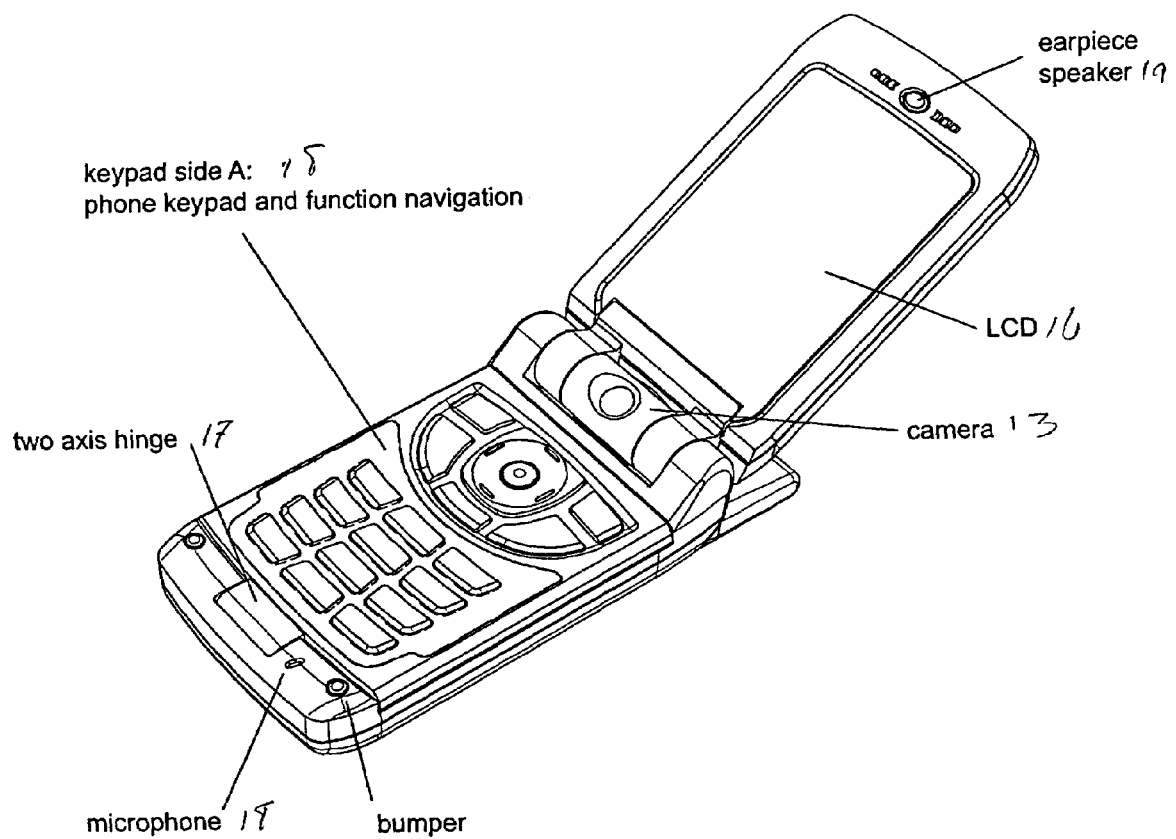
FIG. 2 is a perspective view of the cell phone in the open position providing a mobile telephone with a standard keypad and LCD display.
Figure 3:
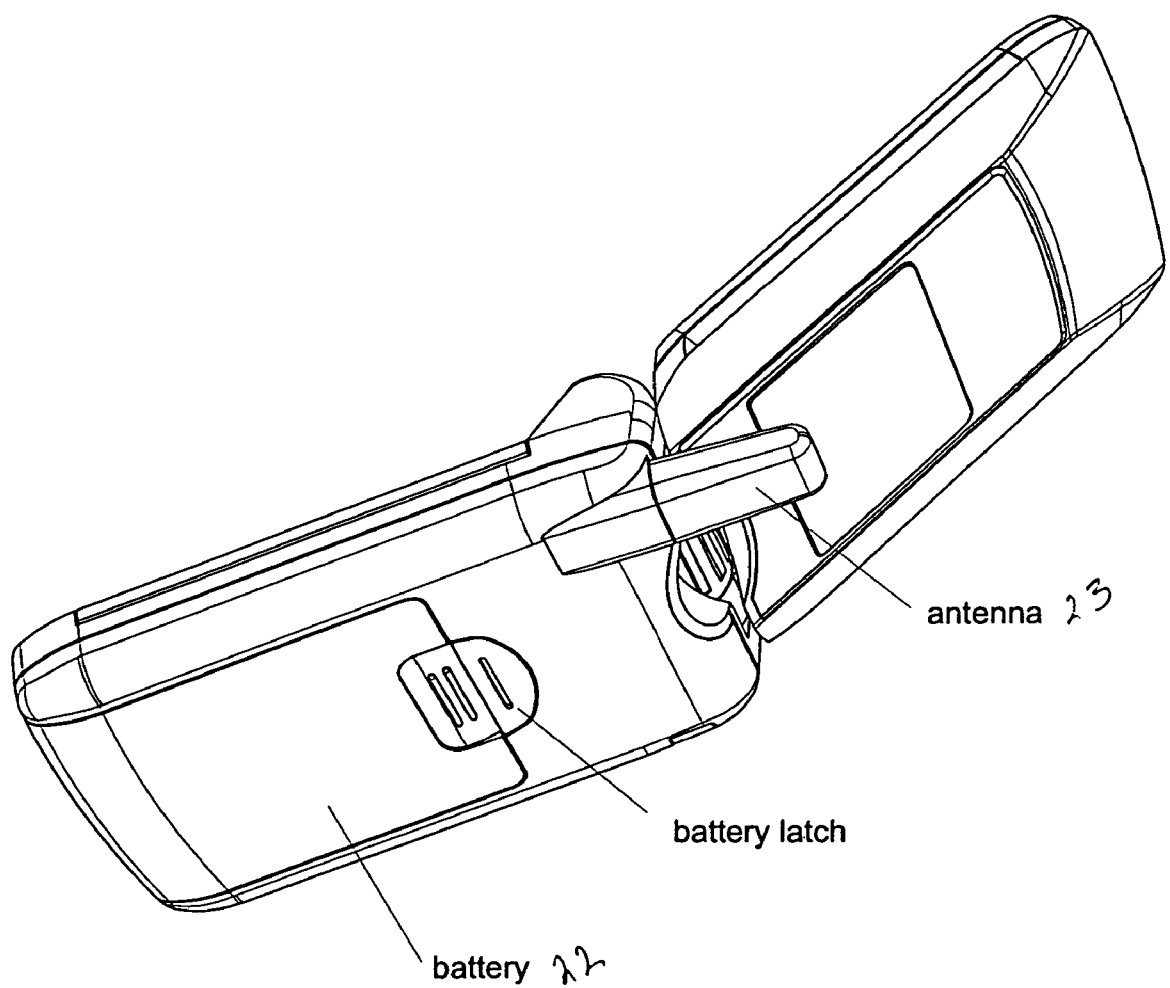
FIG. 3 is a rear perspective view of the wireless cell phone of FIG. 2.

Referring to the various figures, FIG. 1 shows the mobile telephone 11 in its folded position. The cover 12 includes an external liquid crystal display (LCD) which permits viewing incoming telephone calls etc. without opening the telephone. The cell phone also includes a camera 13. Referring to FIG. 2, the cover is opened providing a larger LCD 16. The keypad assembly which is connected to a two-axis hinge 17 to be further described is nested for use as a telephone keypad 18. The cell phone includes a microphone 19 and an earpiece speaker 21. FIG. 3 shows a rear view more clearly illustrating the battery 22 and the antenna 23.

Figure 4:
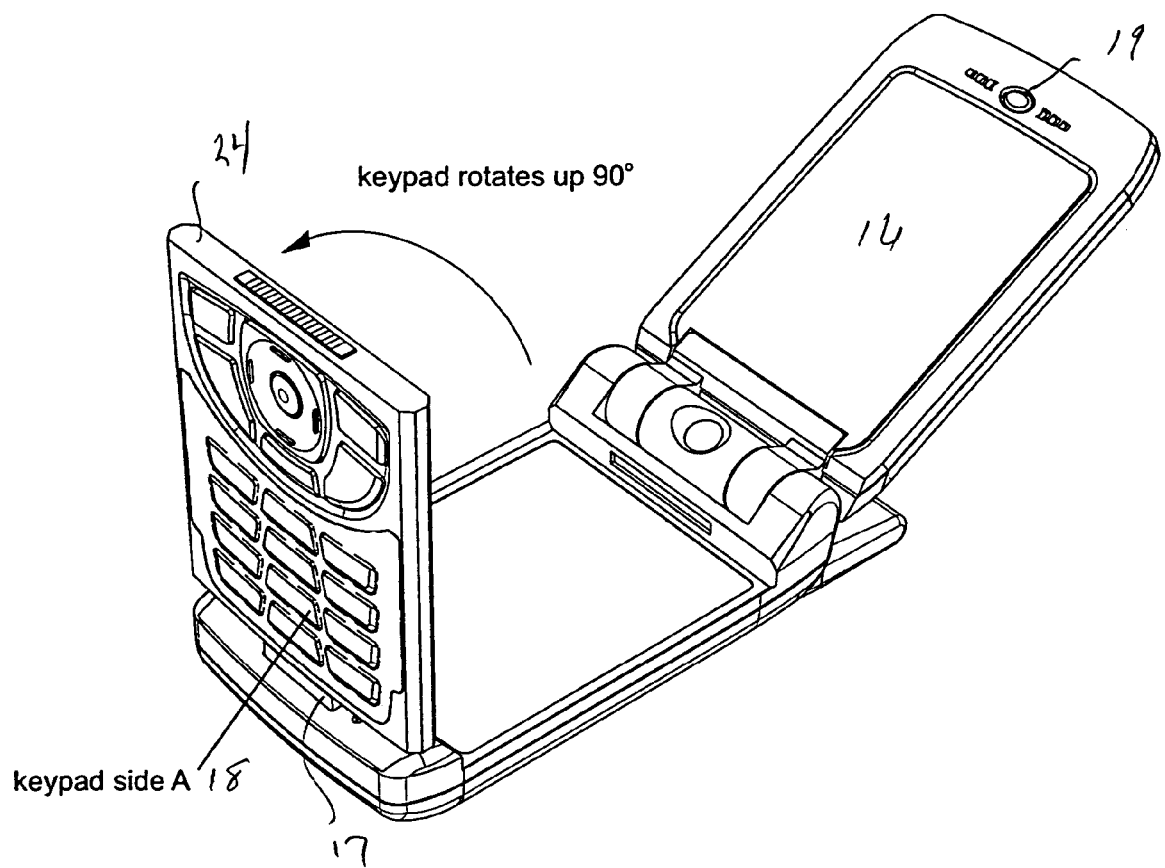
FIG. 4 is a front perspective view of the wireless cell phone with the keyboard assembly unfolding upwardly.
Figure 5:
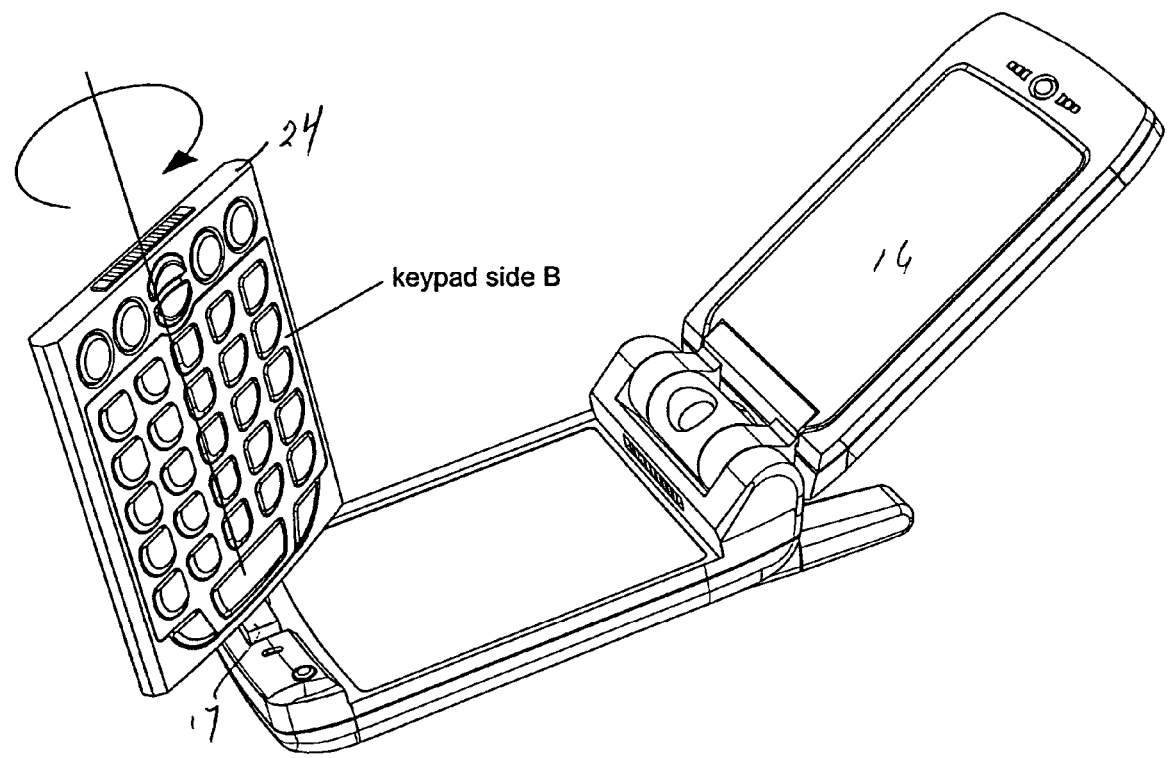
FIG. 5 is a front perspective view of the wireless cell phone with the keyboard assembly being rotated.
Figure 6:
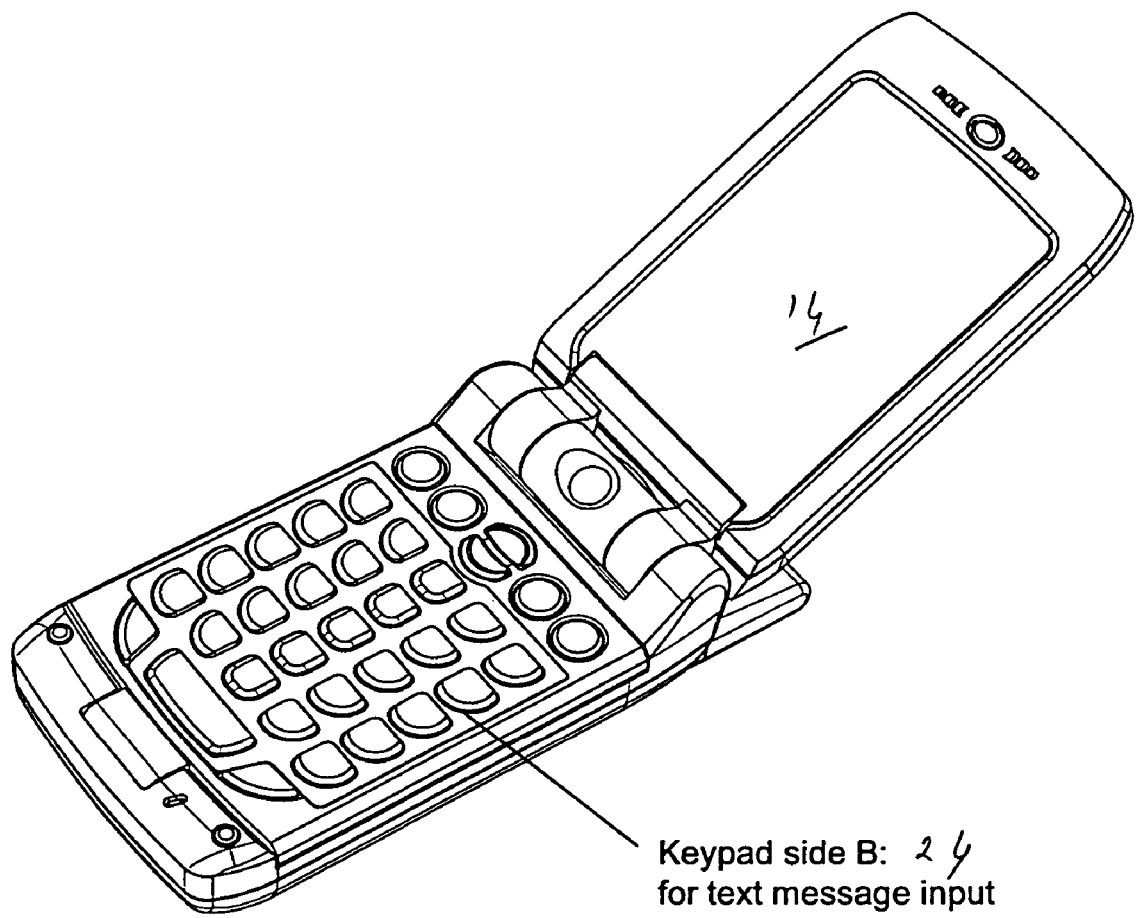
FIG. 6 is a perspective view of the wireless cell phone with the keyboard assembly nested in place to expose text or communication keypad.

The keypad assembly 24 can be rotated upwardly about the hinge 17 as shown in FIG. 4, rotated as shown in FIG. 5 to expose the internet communication keypad and lowered as shown in FIG. 6 to provide a keypad 26 with the LCD display 16. In both the position of FIGS. 2 and 6, the electrical contacts 27 on the keypad assembly and telephone provide the necessary electrical connections between the telephone keypad assembly electronics and the communication electronics in the body of the cell phone for operating the telephone/data communicator.

Figure 7:
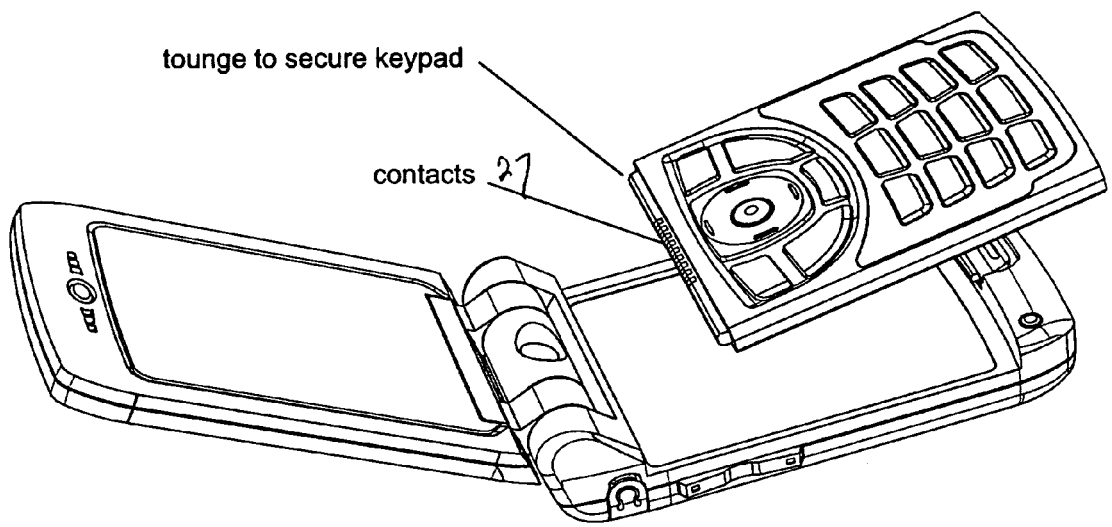
FIG. 7 is a perspective view of another embodiment of the cell phone in which the telephone/data communication keypad assembly is removable.
Figure 8:
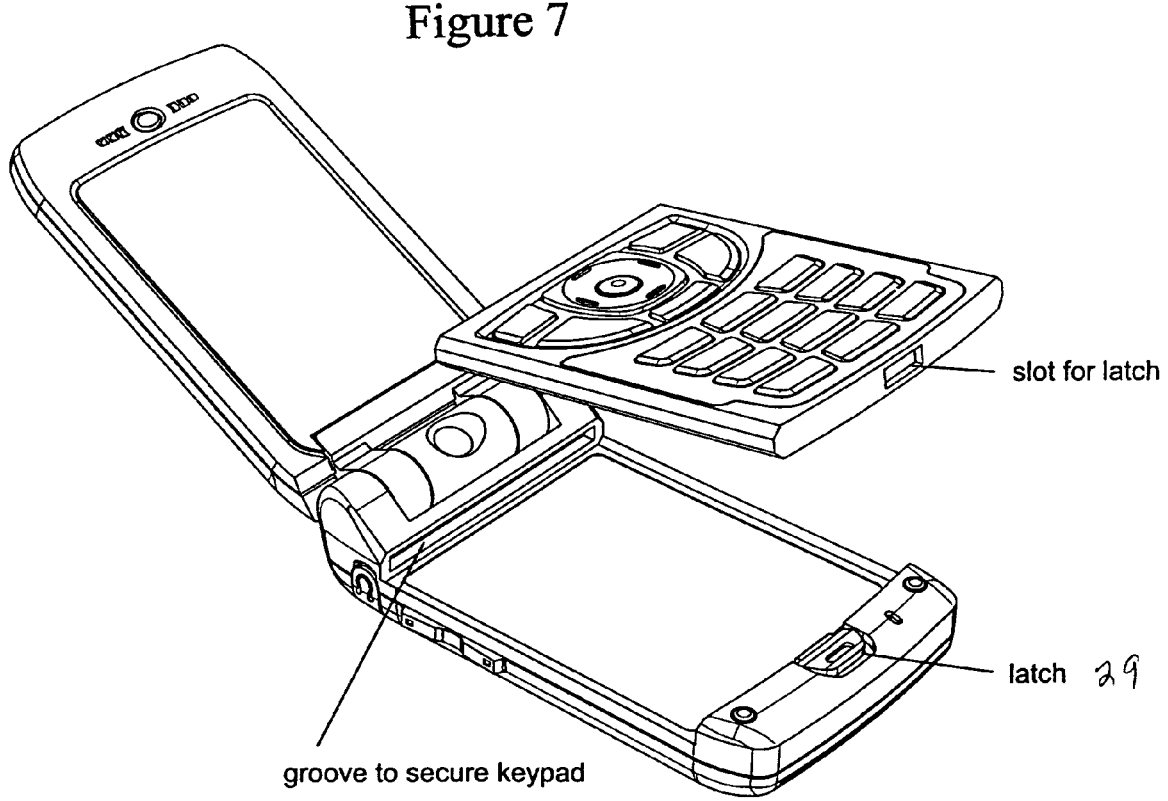
FIG. 8 is another perspective view of the wireless cell phone showing the other end of the removable keypad assembly.
Figure 9:
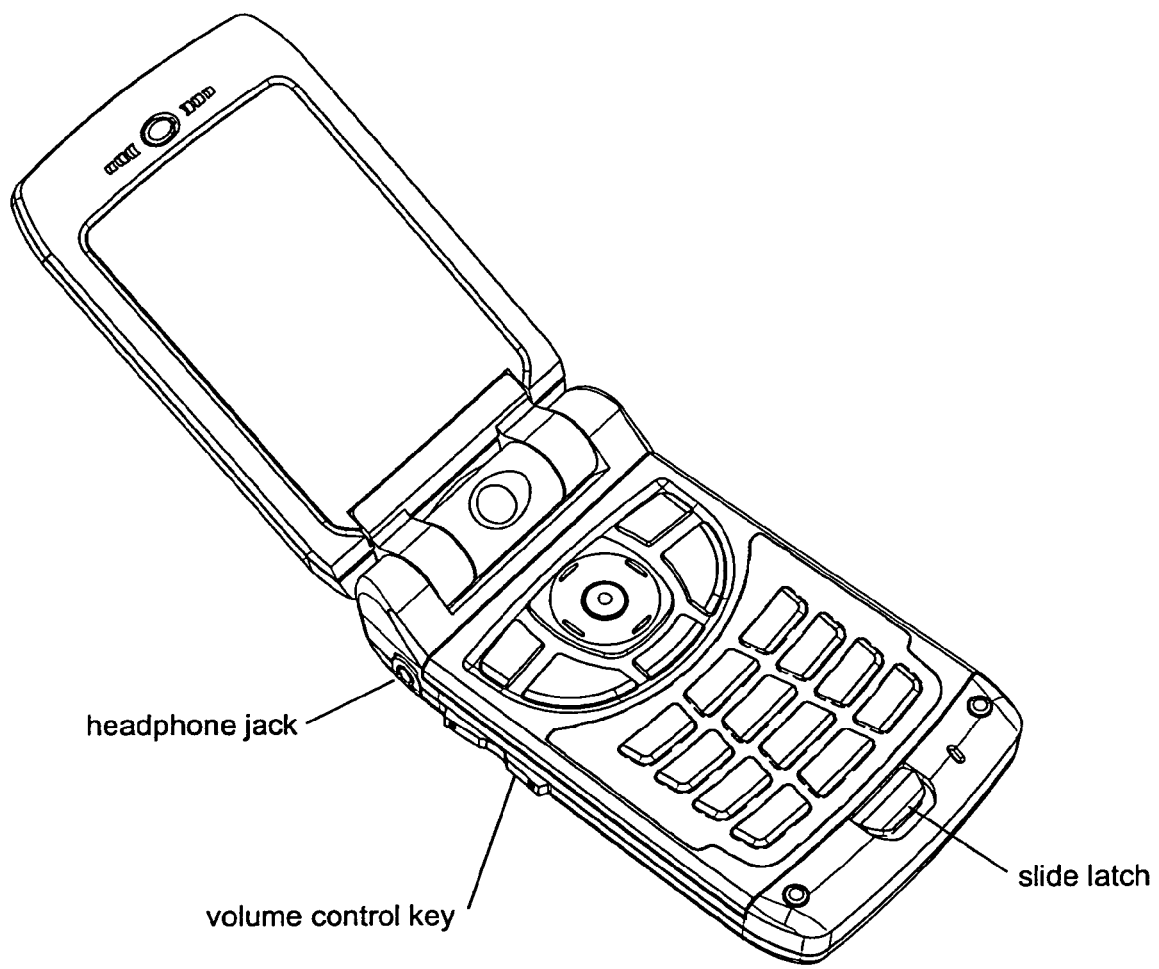
FIG. 9 is a perspective view showing the removable keypad assembly inserted and providing the telephone keypad.

A second embodiment of the invention provides a keypad assembly 24 which is removable as illustrated in FIGS. 7 and 8 and which includes contacts 27 and can be placed into the telephone receptacle and latched into position by latch 29 to expose the telephone keyboard or rotated to expose the data communication keyboard (not shown). FIG. 9 illustrates the keypad in place and latched, which provides a compact, easy to use wireless telephone data communicator.

The present invention is disclosed by reference to the specific embodiments and examples detailed above. It is to be understood that these examples are intended in an illustrative rather than limiting sense, as it is contemplated that modifications and combinations will readily occur to those skilled in the art, which modifications and combinations will be within the scope of the invention and the scope of the appended claim.

What is claimed is:

1. A wireless cell phone comprising:
   a handset;
   a keypad assembly rotatably coupled to the handset, the keypad assembly rotatable about a first rotation axis and about a second rotation axis perpendicular to the first rotation axis, the keypad assembly having a first side on which a telephone keypad is disposed and a second side on which a QWERTY key arrangement is disposed; and
   a handset cover rotatably coupled to the handset and rotatable about a third rotation axis separate from and parallel to the first rotation axis, the handset cover having an interior display unit facing the handset in a folded position of the handset cover with respect to the handset.

2. The wireless cell phone of claim 1, further comprising art exterior display disposed on the handset cover.

3. The wireless cell phone of claim 2 wherein the keypad assembly has a first end for receiving the second rotation axis and a second end opposite the first end, and the keypad assembly is electrically connected to the handset at the second end.

4. The wireless cell phone of claim 2 wherein the keypad assembly is hidden when the handset cover is in a folded position with respect to the handset.

5. The wireless cell phone of claim 2 wherein said exterior display is capable of displaying electronic information when the handset cover is in the folded position.

6. The wireless cell phone of claim 1 which further comprises a camera.

7. The wireless cell phone of claim 1 wherein the handset comprises a microphone.

8. A wireless cell phone comprising:
a handset;
a keypad assembly rotatably coupled to the handset, said keypad assembly has a first side on which a telephone keypad is disposed and a second side on which a QWERTY key arrangement is disposed, said keypad assembly rotatable about a first rotation axis and about a second rotation axis perpendicular to the first rotation axis; and
a handset cover rotatably coupled to the handset and rotatable about a third rotation axis parallel to the first rotation axis, said handset cover comprises an exterior display and an interior display, said exterior display being capable of displaying electronic information when the handset cover is in a folded position with respect to the handset.

9. The wireless cell phone of claim 8 which further comprises a camera.

10. The wireless cell phone of claim 8 wherein the keypad assembly is hidden when the handset cover is in the folded position.

11. A wireless cell phone comprising:
a handset having a far end receiving a slide latch and a near end opposite to the far end;
a handset cover rotatably coupled to the handset at the near end; and
a keypad assembly removably coupled to the handset, the keypad assembly having a latch slot engaging the slide latch, a first side on which a telephone keypad is disposed and a second side on which a QWERTY key arrangement is disposed, the first side facing the handset in a first position of the keypad assembly with respect to the handset, the second side being opposite the first side and facing the handset in a second position of the keypad assembly with respect to the handset, the keypad assembly being latched into die handset by the slide latch.

12. A wireless cell phone comprising:
a handset having a far end receiving a slide latch and a near end opposite to the far end;
a keypad assembly removably coupled to the handset, the keypad assembly having a latch slot engaging the slide latch, a first side on which a telephone keypad is disposed and a second side on which a QWERTY key arrangement is disposed, the first side facing the handset in a first position of the keypad assembly with respect to the handset, the second side being opposite the first side and facing the handset in a second position of the keypad assembly with respect to the handset, the keypad assembly being latched into the handset by the slide latch; and
a handset cover rotatably coupled to the handset at the near end, said handset cover comprises an exterior display and an interior display, said exterior display being capable of displaying electronic information when the handset cover is in a folded position with respect to the handset.

\* \* \* \* \*